United States Patent Office 3,507,748
Patented Apr. 21, 1970

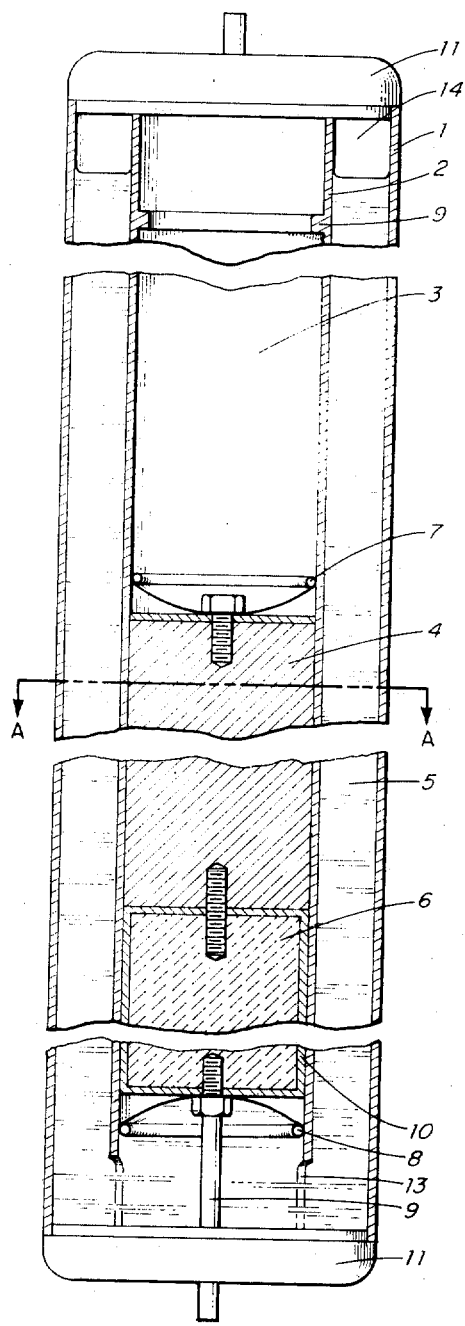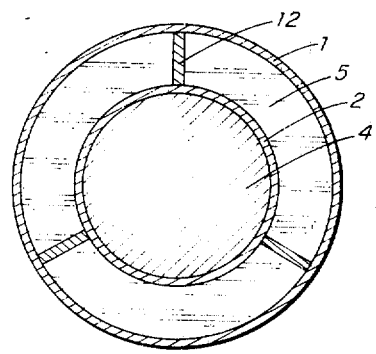
SECTION A-A
FIG. 2
FIG. 1

3,507,748
CONTROL AND SAFETY DEVICE FOR
NUCLEAR REACTORS
Henri Fenech, 399 Salem St., Medford, Mass. 02155,
and Richard A. Farmer, 116 Dudley Road, Bedford,
Mass. 01730
Filed June 7, 1967, Ser. No. 644,336
Int. Cl. G21c 7/16, 9/02, 17/02
U.S. Cl. 176—86                                                    4 Claims

ABSTRACT OF THE DISCLOSURE

The present invention is a device which insures the shutdown of nuclear reactors by introduction of neutron absorbing materials in the reactor core or blanket and reflector. The shutdown can be caused by an excess of power production over and above the system's ability to remove this power. The motion in the said device is caused by an increase in the vapor pressure of an intermediate fluid interposed in the heat flow path between the nuclear fuel and the coolant. This increased pressure causes a net force in the poisoning slug with a resultant deplacement. The device can be shaped and sized according to the need and the reactor geometry. It is self-actuated and inherently safe.

This invention relates to a self-actuated device of a shape similar to the nuclear fuel elements used in nuclear reactors. By incorporating one or several of these devices as an integral part of a bundle of fuel elements making up the nuclear reactor core, the said devices, by proper design, can safeguard and control against excessive power production or excessive heating of the cooling fluid.

Nuclear reactors are generally controlled by means of neutron absorbers, which when introduced into the reactor core, consume the excess neutrons produced by chain reactions with the fissile materials, i.e., U–233, U–235, Pu–239, Pu241. The most commonly used absorber is boron. The neutron absorbers may be in a solid form, for instance boron carbide, and are introduced into the reactor core by means of control rods which can slide in and out of the core. The absorber may be in liquid form as, for instance, a solution of boric acid in water used in Pressurized Water Reactors. The control in this case is achieved by varying the concentration of boric acid in water. In other cases, the control may be achieved by motion of fissile materials in and out of the core by means of control rods or by motion of the reflector surrounding the core.

The control of Nuclear Reactors is required at all times during normal operation in order to maintain the proper balance between neutron production and neutron absorption and losses. The control is also needed in case of unusual circumstances which the rate of heat production is not balanced by the rate of heat removal and also during start-up and shut-down operations. In order to achieve this control and regulate the movement of control material, one usually relies on control rod drive mechanisms. There are mechanical, electrical, gravitational or other combination of systems located outside the nuclear reactor core and responding to an automatic or manual control system. In the case of chemical control, a bleed and feed system permits one to vary the concentration of control materials as needed. In most instances for this type of control an injection pump is used.

It is of paramount importance that the control system for a nuclear reactor be reliable and perform its function, particularly in case of emergency when rapid action is needed. In the present state of the art two different means of control are provided. One control maintains the reactor core critical during normal operation. This control is commonly called shim control and is characterized by a slow response. A more rapid means of control referred to as scram provides for quick shut down in case of abnormal operation or accident. Those possible accidents being considered as credible include: the insertion of excess fissile material during core loading, the accidental ejection of a control rod due to a mechanical failure, the loss of coolant flow due to total loss of pumping capability or the loss of coolant through a primary system rupture. In certain types of reactors, such as the Fast Sodium-Cooled Breeder Reactors, the local boiling of the liquid metal coolant in a channel may be sufficient to initiate a major accident and has to be avoided.

The reactor control rods are usually monitored on the neutron flux level in the core or reflector and on the coolant temperature. In-core instrumentation is, however, not entirely satisfactory. The detectors are in an unfavorable environment of high temperature and radioactivity and cannot be made foolproof and removable with ease. These detectors are therefore in small numbers and placed where operating conditions are less demanding but also less representative. For instance, a neutron flux detector in the reflector is not an accurate indication of the maximum flux in the core. Likewise, a thermocouple at the channel outlet does not reliably indicate the maximum fuel element surface temperature. In addition to these difficulties, the control rods themselves usually weigh several hundred pounds and also are prone to buckle and be stuck in their sliding guides. The drive mechanism for these control rods are also subject to failure. The control rods themselves, because of their relatively large size, also cause gross distortion of the power distribution and undesirable power peaking. The chemical control mentioned above is not sfficiently fast to be used in case of emergency.

An object of the invention is to provide a nuclear reactor shutdown device which is placed in the reactor core and blanket, and does not need any external drive or external power for its operation. This device can be made an integral part of the fuel element bundle and does not need to be guided in and out of the reactor core and blanket. The said device is simple in design, self-actuated, and thus inherently safe.

Another object of the invention is to provide a self-actuated, in-core nuclear reactor safety device which can safe-guard the nuclear reactor, surrounding installation and personnel against one or several undesirable working conditions. By incorporating some simple features, as described below in the design of said device, it is possible to provide one or both of the following:

(a) A safeguard against overheating a Nuclear Reactor cooling fluid. This may be needed, for instance, in a Fast Breeder Reactor to prevent the liquid metal coolant from boiling or in a Pressurized Water Reactor to avoid bulk boiling of the water. In a Boiling Water Reactor the said device can be designed to prevent an excessive amount of steam in the reactor core. In a heavy water-moderated, light water-cooled reactor the said device can be designed to prevent the dangerous evaporation of the light water coolant.

(b) A safeguard against an excessive power production. This excessive power can be produced accidentally in a nuclear reactor when the proper pbalance between gain and loss of neutron is not established and therefore the neutron flux increases exponentially with time. Although this situation eventually leads to an overheating of the coolant, the response is much more rapid when the said device is made sensitive to power production.

The invention embodies other novel features, constructional details and arrangement of parts which are hereinafter set forth in the specification and claims, and illustrated in the drawings forming part thereof, wherein:

FIGURE 1 is a longitudinal section illustrating a fuel element embodying features of the device.

FIGURE 2 is an enlarged transverse section taken along the line A—A of FIGURE 1.

The safety and control device consists of two concentric tubes 1 and 2 as shown in FIGURE 1. The two ends of the outer tube 1 are sealed by the caps 11. The annular space between the two tubes is also sealed on the upper end, and the working fluid 5 which fills it communicates with the inside of tube 2 by an opening 13 provided on the lower end of said annular space. The two tubes are maintained concentric by the ribs 12 shown on FIGURE 2. The inner tube 2 provides a space 3 filled with a gas which is prevented from escaping by the end cap 11 on one end of said space and by a gas tight sliding seal 7 on the other end of said space. A slug 4 is attached to and rests on top of a second slug 6. The lower end of the slug 6 holds a gas tight sliding seal 8 which permits the working fluid to apply its full hydraulic pressure on the end of said slug 6, and prevents the working fluid from flowing through and beyond said slug 6. When assembling this device some space 14 may be left above the working fluid. The said space 14 could contain a gas in addition to the vapor released by the working fluid. The nature of the gases occupying, respectively, spaces 3 and 14, the nature of the working fluid in the annular space 5 and passage 13 as the material used to make up the slugs 4 and 6 will depend on the specific purpose selected for this device. The general mode of operation for this invention is the following: When abnormal conditions develop in the reactor core, e.g. accidental coolant flow reduction or excessive power, the temperature of the working fluid in the annulus 5 will increase, raising the corresponding vapor pressure. The resulting rising pressure applied on the seal 8 at the bottom of slug 6 will cause the slugs 6 and 4 to rise. This motion will continue until the increase in gas pressure in space 3 will be sufficient to bring about a new state of equilibrium or until slug 4 hits the lugs 9. The higher the working fluid temperature, the higher the equilibrium position. The relationship between temperature and equilibrium position is affected by several design variables. The most important of these variables are the nature of the working fluid and the gases, the initial gas pressure and the density and height of the slugs 4 and 6.

By means of illustration, we will describe two specific applications for this device.

(a) Some types of Fast Breeder Reactors use sodium as a coolant. If we wished to control the temperature of the sodium safely below its point, we would incorporate one or several of these devices in each bundle of fuel element tubes. We would determine the length of slug 4 to form an appropriate weight on top of slug 6. Slug 6 would be located in the lower blanket region. The core would be of stainless steel or any other appropriate structural material and the slug 6 would be made of some neutron absorber, sintered boron carbide, for instance, contained in a stainless steel capsule 10.

The dimensions of the said device would depend on the reactor core size. Approximate dimensions under normal operating conditions would be as follows

|  | Inches |
|---|---|
| Length of gas space 3 | 42.0 |
| Length of slug 4 | 36.0 |
| Length of slug 6 | 18.0 |
| Inner diameter of tube 2 | 0.310 |
| Width of annular space 5 | 0.060 |

The space 3 is filled with Helium at 16 p.s.i.a. and 1200° F. under normal operating conditions in the hot channel. An increase in the sodium coolant temperature from 1200° F. to 1740° F. will cause a similar temperature rise of the liquid potassium in the annulus. The corresponding increase in the potassium vapor pressure from 3 p.s.i.a. to 64.39 p.s.i.a. is sufficient to lift the slugs 4 and 6 by 25 inches. This action moves the poison slug 6 into the reactor active code and thus contributes to an increased neutron absorption. A boron carbide slug of the size considered above is worth approximately 2.4 cents of reactivity. Thus, five of the said control device would be sufficient to compensate for the increase in reactivity caused by voiding a channel of 300 fuel elements as a result of sodium boiling.

(b) By substituting a fissile material such as U–235, U–233, Pu–239 for the stainless steel in slug 4 it is possible to increase the reactivity worth of the safety device. This substitution would make the said device not only sensitive to excessive temperature but also to excessively high fission rate or high neutron flux. This is because an increase in heat production in slug 4 would result in an increase in the temperature of the liquid annulus and, therefore, in a net vertical motion of slugs 4 and 6. By this motion the substitution of a poisonous material contained in 6 for a fissile material in 4 would cause larger changes in the neutron balance and also larger decreases in reactivity.

The high pressure water, used as a coolant in pressurized water reactors, can be prevented from exceeding too high a temperature or boiling when low pressure water or another suitable liquid is used to fill the annulus 5 of said device. Excessive boiling in a channel of a boiling water reactor could similarly be controlled. Because the last two types of reactors work mostly with neutrons in the thermal energy range, the slug 4 should be made of a low thermal neutron absorber such as Zircalloy 4, aluminum or similar.

Although specific terms and examples are employed, they are used in a generic and descriptive sense and not for purposes of limitation; the scope of the invention being set forth in the following claims:

We claim:

1. A nuclear reactor control and safety device comprising two concentric tubes of equal length, the outer tube sealed on both ends, the inner tube sealed on one end only, the other end of said inner tube communicating with the annular space between the two tubes, the said inner tube containing a gas trapped between the sealed end of said inner tube and two sliding slugs, the slugs being in contact through the open end of said inner tube with a liquid filling the annulus between the two concentric tubes, the said slugs being positioned inside said inner tube by an equilibrium of forces due to the gas pressure on one side and the pressure of the liquid on the other.

2. A nuclear reactor control and safety device comprising two concentric tubes of equal length, plugs sealing both ends of said tubes, said inner tube communicating with annulus between the two tubes through openings on one end only, other end of said inner tube sealed and containing a gas compressed by action of a liquid and vapor in said annulus through two solid slugs sliding in inner tube, one said slug next to the gas being in stainless steel and other said slug next to liquid and containing neutron absorbing material, sliding seals provided to prevent leakage of gas or liquid into space occupied by said slugs.

3. A nuclear reactor control and safety device comprising two concentric tubes of equal length, plugs sealing both ends of said tubes, said inner tube communicating with annulus between the two tubes by means of openings on one side, other side of said inner tube sealed and containing a gas compressed by action of a liquid and its vapor contained in said annulus on two solid slugs sliding in said inner tube, one said slug next to the gas containing fissile and fertile material in such a proportion as to maintain constant fissile material inventory, other said slug next to the liquid and containing neutron absorbing material, sliding seal provided to prevent leakage of gas or liquid into space occupied by said slugs.

4. A nuclear reactor control and safety device comprising two concentric tubes of equal length, plugs sealing both ends of said tubes, said inner tube communicating with annulus between the two tubes by means of openings on one side, other side of said inner tube sealed and containing a gas compressed by action of a liquid and its vapor contained in said annulus on two solid slugs sliding in said inner tube, one said slug next to the gas containing weak neutron absorbing material, other said slug next to the liquid and containing strong neutron absorbing materials, sliding seals provided to prevent leakage of gas or liquid into space occupied by said slugs.

References Cited

FOREIGN PATENTS

| | | |
|---|---|---|
| 228,060 | 6/1958 | Australia. |
| 866,644 | 4/1961 | Great Britain. |
| 968,212 | 9/1964 | Great Britain. |

REUBEN EPSTEIN, Primary Examiner

H. E. BEHREND, Assistant Examiner

U.S. Cl. X.R.

60—23; 73—368.2; 92—152; 236—100